(12) United States Patent
Wilton

(10) Patent No.: US 7,946,049 B1
(45) Date of Patent: May 24, 2011

(54) DECK SPACING TOOL

(76) Inventor: Adam Wilton, Victoria (CA)

( * ) Notice: Subject to any disclaimer, the term of this patent is extended or adjusted under 35 U.S.C. 154(b) by 0 days.

(21) Appl. No.: 12/641,286

(22) Filed: Dec. 17, 2009

(51) Int. Cl.
*G01B 5/16* (2006.01)
*G01B 3/30* (2006.01)

(52) U.S. Cl. ........................... 33/526; 33/613

(58) Field of Classification Search ............ 33/526, 33/527, 334, 347, 638, 613
See application file for complete search history.

(56) References Cited

U.S. PATENT DOCUMENTS

| | | | | |
|---|---|---|---|---|
| 1,805,285 A * | 5/1931 | Jacobs | | 33/642 |
| 3,010,213 A * | 11/1961 | Rodtz, Sr. | | 33/526 |
| 4,457,078 A * | 7/1984 | Suchy | | 33/334 |
| 4,656,749 A * | 4/1987 | Ashley et al. | | 33/334 |
| 5,465,492 A * | 11/1995 | Bond | | 33/275 R |
| 6,510,621 B2 * | 1/2003 | Camara et al. | | 33/645 |
| 6,665,948 B1 * | 12/2003 | Kozin et al. | | 33/833 |
| 6,769,191 B1 * | 8/2004 | Zusman | | 33/526 |
| 6,973,735 B1 * | 12/2005 | Billiot | | 33/526 |
| 7,305,774 B1 * | 12/2007 | Whaley | | 33/613 |
| 2004/0134086 A1 * | 7/2004 | Allen | | 33/638 |

* cited by examiner

*Primary Examiner* — Christopher W Fulton
(74) *Attorney, Agent, or Firm* — Gordon Thomson

(57) ABSTRACT

A tool for use in spacing deck boards on typically framed deck structures that is in the form of a cylindrical arm with a ½" eye located at one end. The arm is the thickness of a desired gap between spaced decking and the eye attaches to a drills handle assembly by means of sliding the bolt, which attaches the handle assembly to the drill, through the eye of the tool and tightening the handle to the drill, thus securing the tool to the drill.

6 Claims, 3 Drawing Sheets

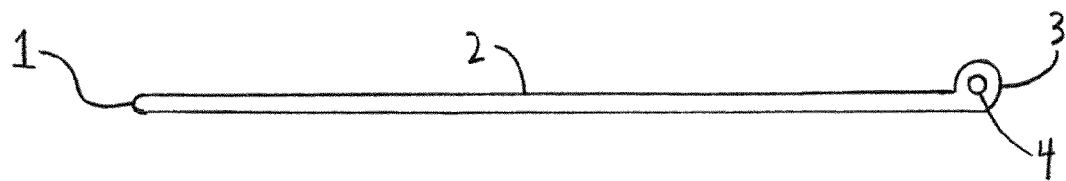
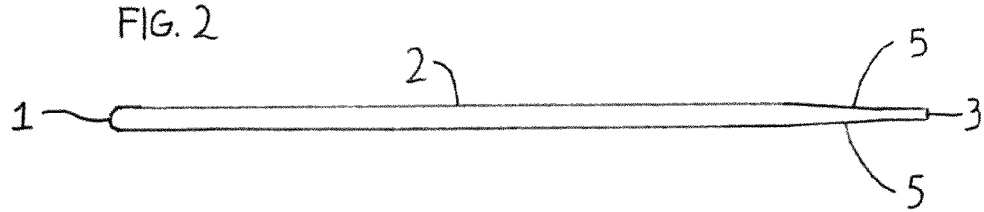
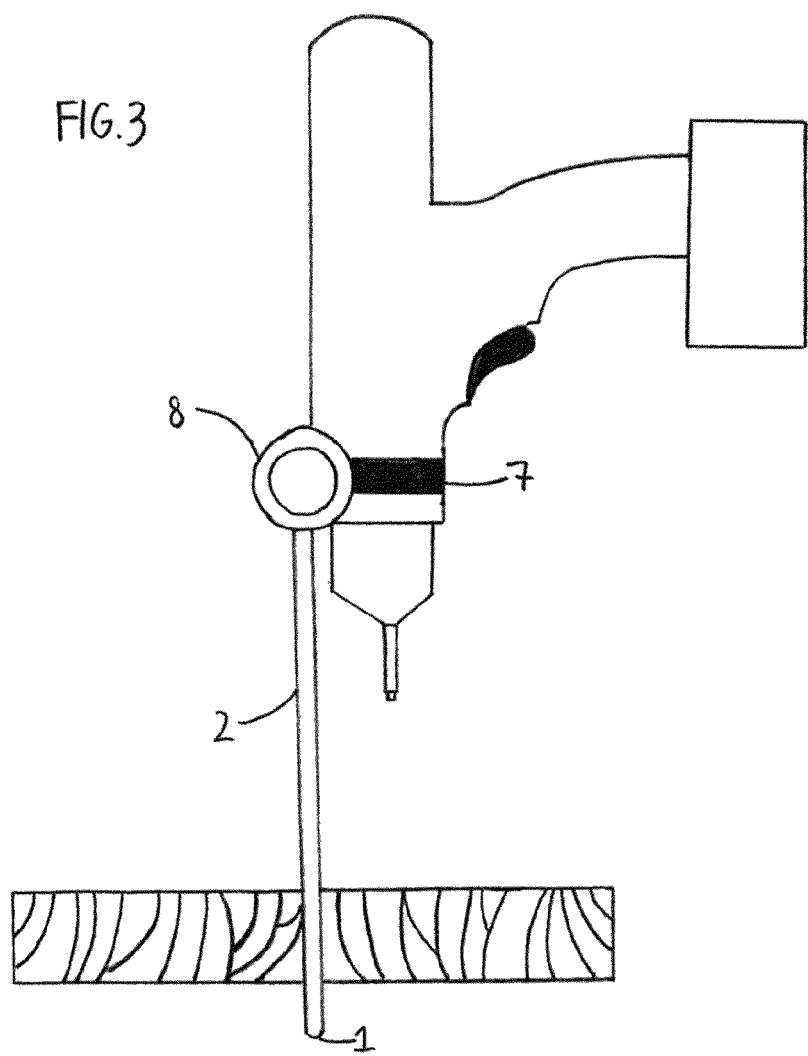

US 7,946,049 B1

DECK SPACING TOOL

FIELD OF THE INVENTION

This invention relates to the field of hand tools used in construction and particularly in the field of deck construction. Specifically this invention relates to a deck spacing tool.

BACKGROUND OF THE INVENTION

This tool is used for spacing many types of decking material in many applications. It can be used in the construction of decks, docks, stairs and anywhere uniform gaps are required between decking members.

There are only a few requirements for a sound deck. Build it level, square, structurally sound, and have your decking run straight with uniform gaps. The reasons you gap your planks is for swelling of the boards, no build up of debris, and to allow water to run off the surface.

When in use, the tool is controlled easily by the worker both when being retracted and while drilling. When the tool has spaced the board sufficiently enough it is simply flipped back, and locked in place with a couple of turns of the handle. All of this is done without pulling a spacer out of a tool pouch or walking across the deck to where it might have been used last. The tool stays on the drill ready for use until the job is done.

The most unique feature about this tool is that it takes out a step thus freeing up a hand for the worker to grab the next screw faster. Using alternative methods makes the task that much longer, in which the process would be; pulling the spacer out of the tool pouch, putting the spacer in, grabbing a screw, screwing the plank down, pulling the spacer out from between the planks, putting the spacer in the tool pouch and moving to the next joist.

There are many tools for spacing decking. Some more elaborate than others. They range from the old art of using a nail to multi-functioning tools such as Phillips U.S. Pat. No. 4,930,225 where it has holes for you to space your screws or nails, it has an angle on one end to mark out boards and it has a ruler on the side for measuring. This tool pretty much sums up all of the deck spacing tools patented today. But it is completely unnecessary. You don't need screw positioning holes. You put the screws where they look good. You don't need an angle on the tool because the speed square invented by Alfred J. Swanson in 1925 does that and the majority of construction workers own one. And everybody has a tape measurer. All of the tools out there vary, but they are all more complicated than they have to be.

Using a nail is the way of the past. New tools should outdo the previous ones by making the job easier and more efficient. Having to keep track of little spacers or lugging around bigger ones slows the job down and creates an unorganized workspace. It's time to take a step forward with this process.

SUMMARY OF THE INVENTION

The present invention is namely applied to spacing deck boards at a uniform space which lay upon a framed structure. The tool is a cylindrical arm made at the thickness of an average gap to be desired between two adjacent deck boards, and is long enough so that the drills drill bit does not touch the deck board underneath it. At the drill end of the tool there is an eye which the bolt of the handle assembly slides through therefore making the drill and the tool one. The handle is just tight enough while spacing the decking so that the arm can move out and swing in front of the unscrewed board allowing the worker room to screw the board in place.

BRIEF DESCRIPTION OF THE DRAWINGS

FIG. 1 is a side elevation view of the present invention;
FIG. 2 is a top elevation view of the present invention;
FIG. 3 is side elevation view of the present invention spacing two deck boards whilst attached to the drill.

DETAILED DESCRIPTION OF THE INVENTION

Figure 6:
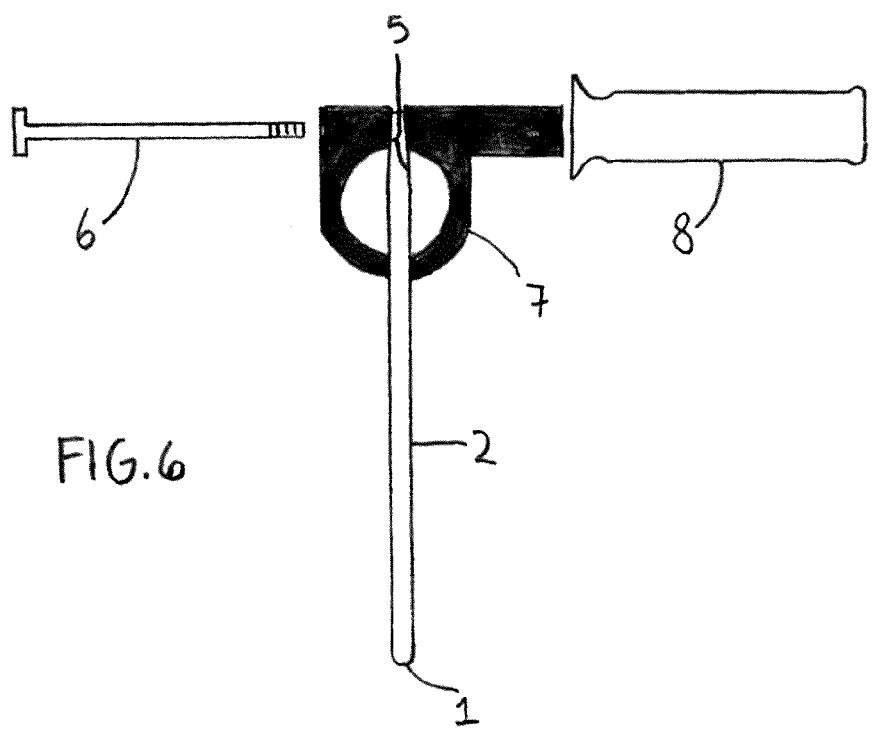
FIG. 6 is a front elevation view of the assembly process in which the bolt is slid through said tool, thus securing said tool to said handle assembly.

The present invention could be made of a durable plastic or metal constructed through a molding process. Creating it out of a durable plastic would make it an easy and inexpensive way of producing this tool. The tool is roughly 11 inches long split up in to three parts. The longest part is shown in FIG. 1 by reference character 2 being roughly 10 inches long consisting of a 3/16" thick cylindrical arm ending at a rounded over head 1. FIG. 2 shows that the last inch of the arm before reference character 3, tapers down to a thickness of a 1/8" of an inch 5. At this end is a 1/2" diameter circle 3 that is an 1/8" thick with a 1/4" diameter hole 4 in the center for the bolt 6 of the drills handle assembly (seen in FIG. 6) to slide through. The handle 8 must be tightened to the point where it will not slide off yet the tool is still able to swing freely up and down.

Figure 4:
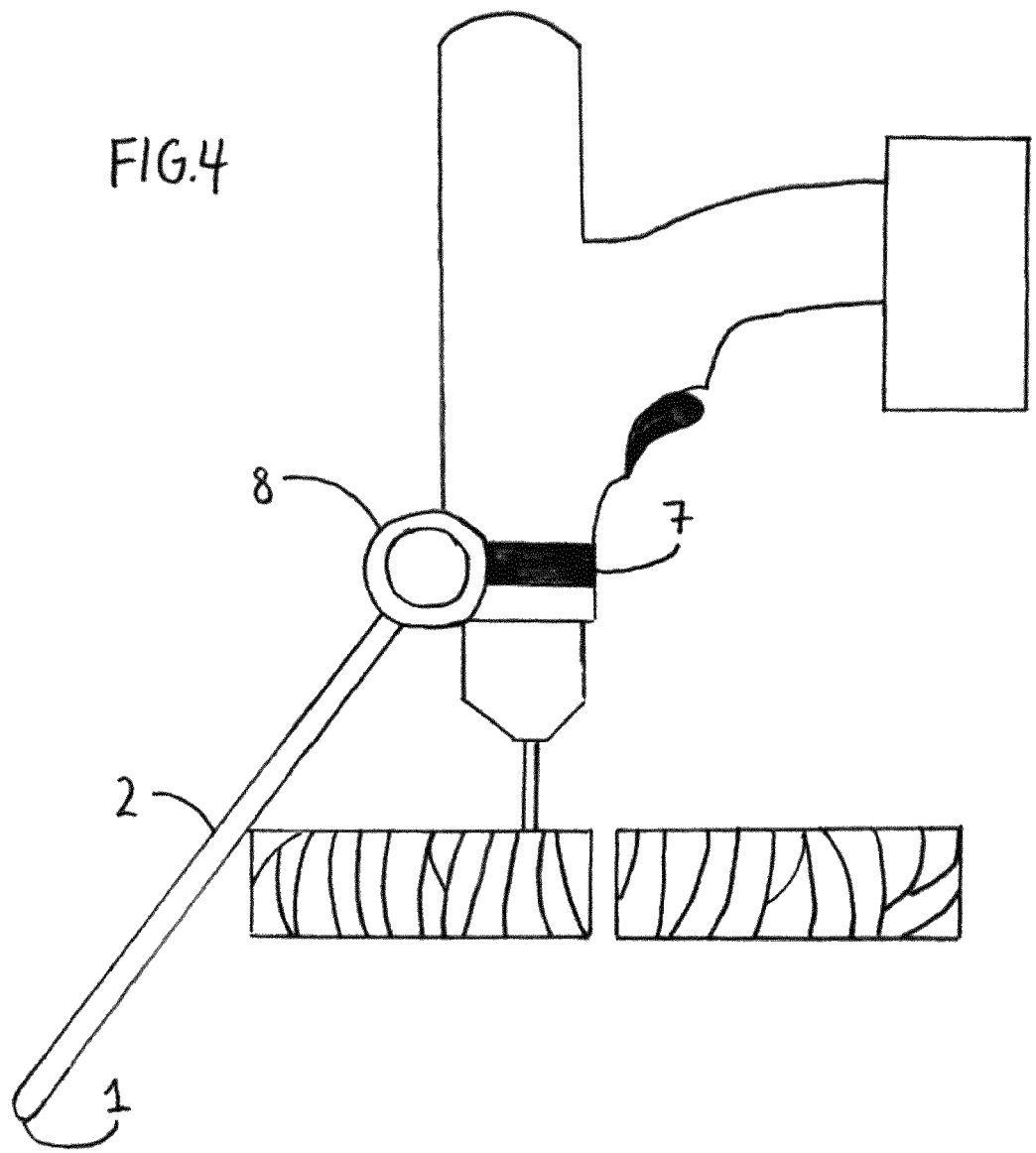
FIG. 4 is a side elevation view of the present invention pivoted and resting on the deck board whilst the worker has screwed the deck board in place.

The arm is lowered below the deck as illustrated in FIG. 3 such that when the adjacent board is pulled up against said tool, it is spaced the thickness of said tool. While applying pressure to the spaced adjacent bored, the drill is pulled upwards bringing the tool from the gap. The spacer is then placed on the other side of the adjacent board as shown in FIG. 4 while the worker screws the board in place. The angle of the tool in relation to the deck will simply get bigger because it is able to swing freely on the handle assembly.

Figure 5:
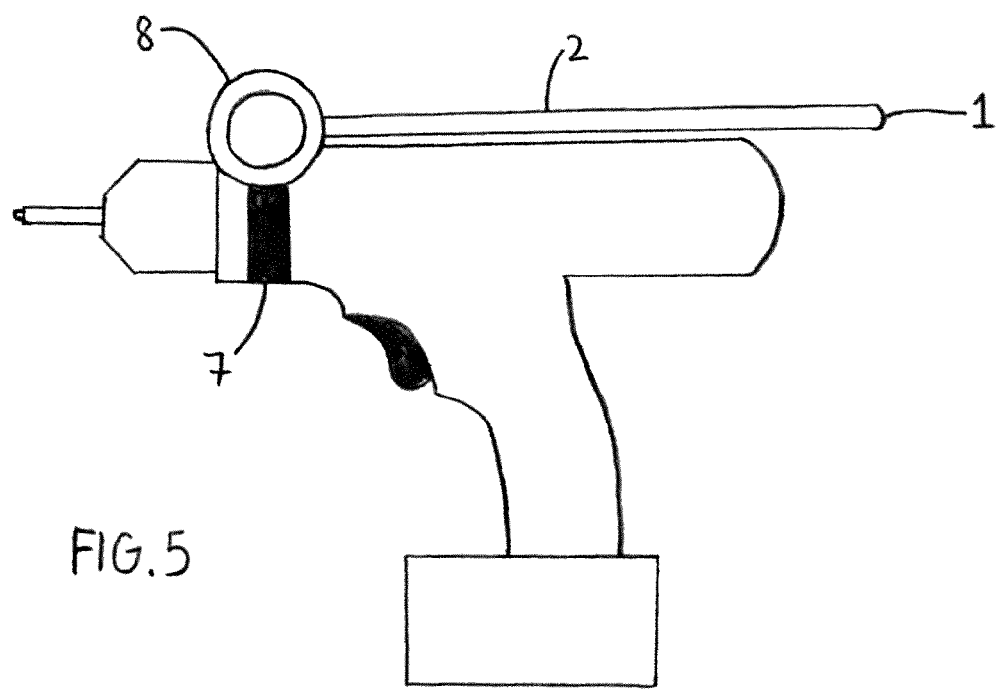
FIG. 5 is a side elevation view of the present tool flipped back in the locked position.

Once this step has been repeated at either end of the board and as many times necessary on the infield for the board to remain straight without the need of the spacer, the tool is flipped backwards as seen in FIG. 5 and secured in that position with a couple of turns of the handle, squeezing the middle component of the apparatus 7 on both sides of the eye 3 thus, locking it in place. Therefore allowing the worker to screw to the remaining joists on the infield of the deck board without interference.

When in use it is controlled easily by the worker both when being retracted from the deck boards and while drilling. This being said, the present invention does what it is suppose to do and it does it smoothly and efficiently.

Even though certain embodiments have been stated pertaining to the present invention, slight alterations may be necessary in future adaptation to specific drill makes.

What is claimed is:
1. A deck spacing tool for uniformly spacing decking members, said deck spacing tool comprising a projecting member having a first end placed tightly between a first and second decking member, a second end pivotally attached to a handle assembly that is releasably fixed to a power drill comprising a chuck, a body and a body linear axis co-axial with a drill bit axis; wherein said projecting member is cylindrical having a constant diameter from a point proximate to said second to said first end; and wherein said constant diameter is a predetermined and desired spacing between said first and said second decking members; and wherein the projecting member second end comprises a swaged portion having an eye for pivotally attaching to said handle assembly by a bolt having a threaded end portion; and wherein the handle assembly comprises a hand rip projecting from said power drill body perpendicular to said linear axis, a clasping ring for attaching the handle assembly and the projecting member to said power drill body and said bolt.

2. The tool of claim 1 wherein said clasping ring comprises a body having a top end having a projecting portion, a gap in said top end and a yoke portion, wherein said top end and said projecting portion further comprise a bore adapted to receive the bolt.

3. The tool of claim 2 wherein the hand grip includes a solid portion and a hollow portion, wherein said hollow portion is adapted to slide over the projecting portion and the solid portion includes a threaded aperture adapted to receive said bolt threaded end.

4. The tool of claim 3 wherein said swaged portion is disposed in said gap so that the bolt passes through said eye and so that the projecting member is able to pivot from a secured extended position forward of and parallel to said bit and a secured retracted position rearward of and parallel to the bit.

5. The tool of claim 4 wherein said yoke is adapted to receive said power drill body rearward of said chuck, and wherein the yoke is secured to the power drill body by a tight friction fit when the bolt is tightened into the hand grip.

6. The tool of claim 5 wherein the projecting member is able to traverse from said secured extended position to said secured retracted position by turning the hand grip to loosen the bolt and then tightening the hand grip on the bolt.

\* \* \* \* \*